Jan. 14, 1958   S. BELEC   2,819,874
WHEELED CARRIER MOUNTED DRUM
Filed Sept. 20, 1954   4 Sheets-Sheet 2
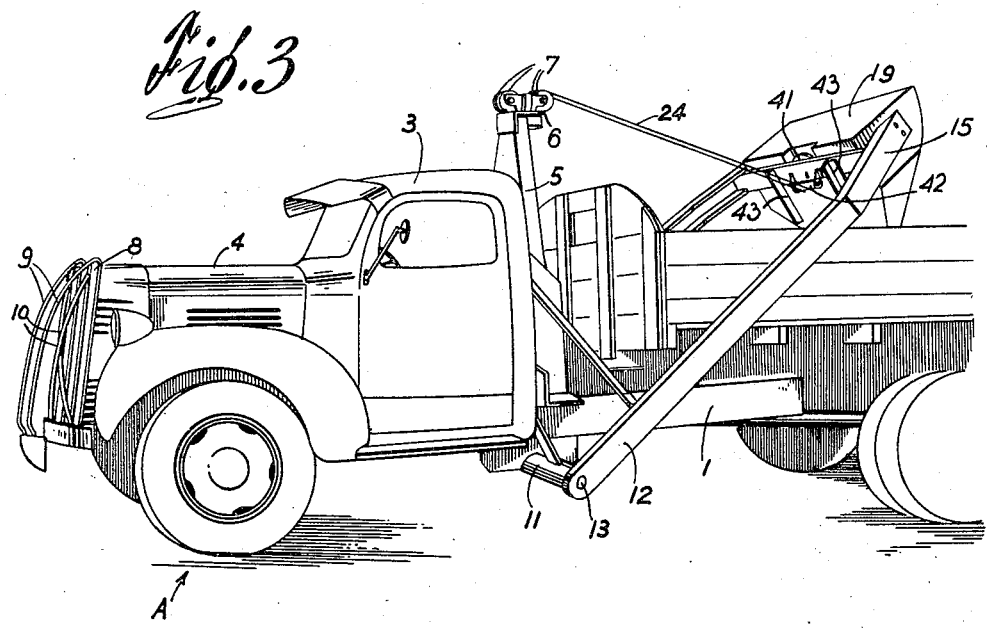
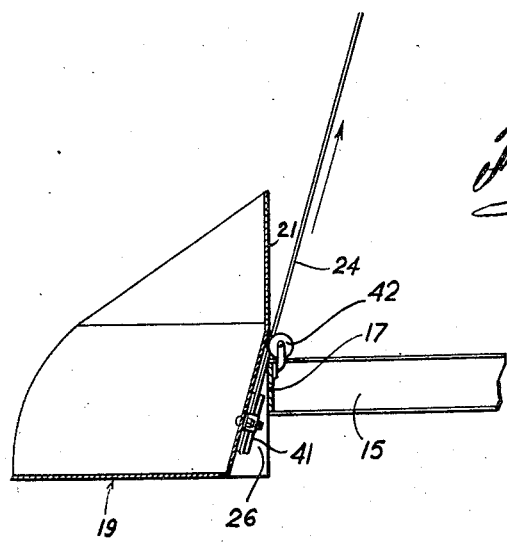
Inventor
Siméon Belec
Attorneys Jan. 14, 1958        S. BELEC        2,819,874
WHEELED CARRIER MOUNTED DRUM Filed Sept. 20, 1954        4 Sheets-Sheet 3

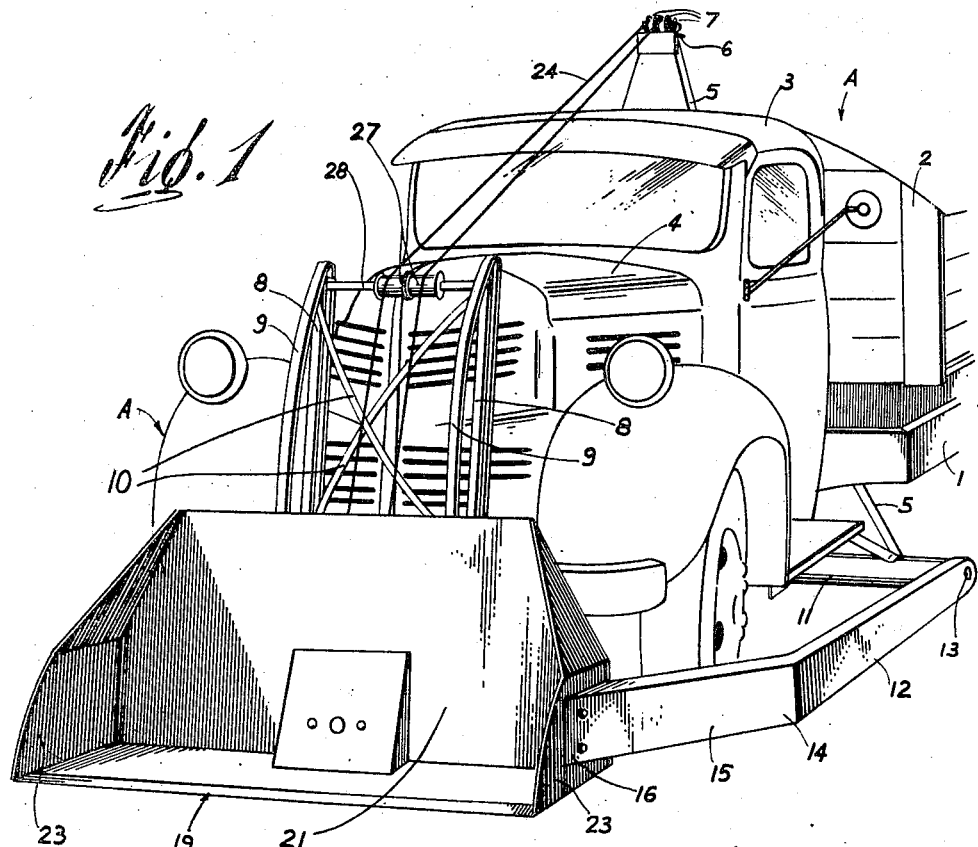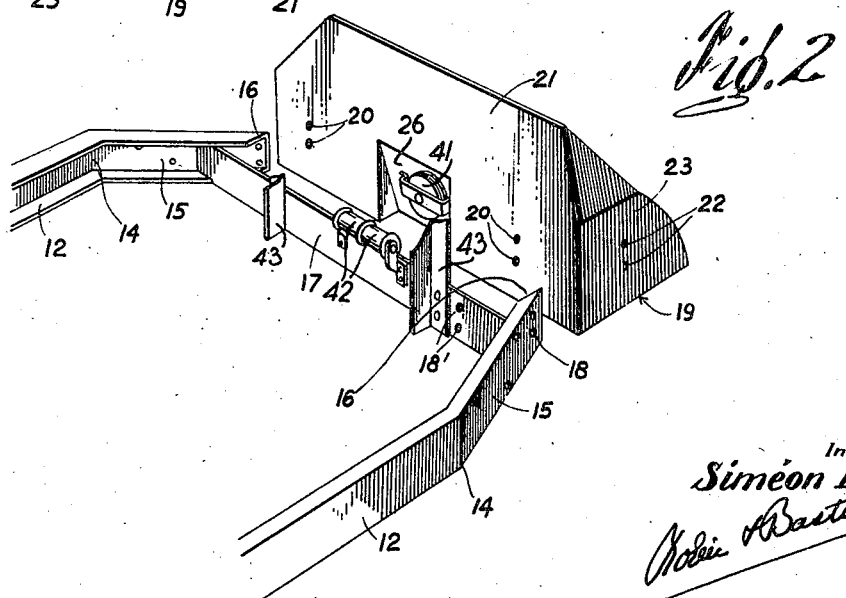

Inventor
Siméon Belec

Attorneys

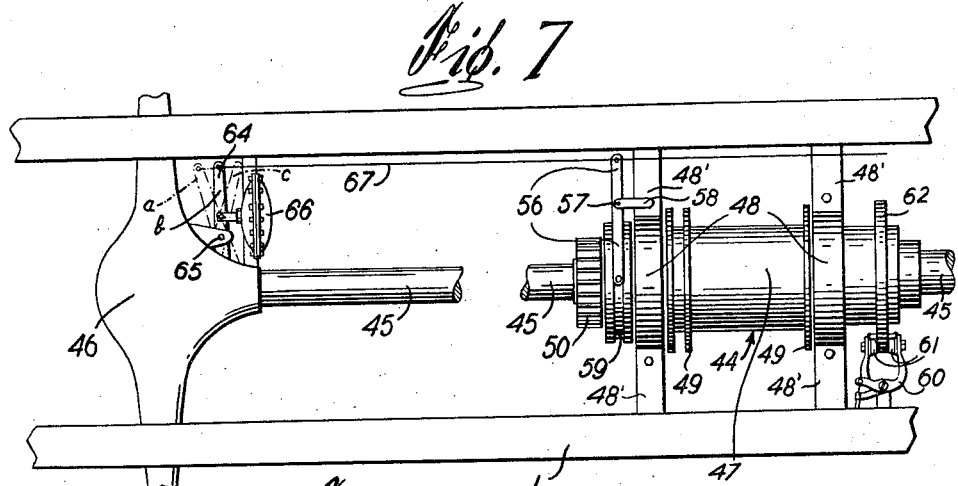
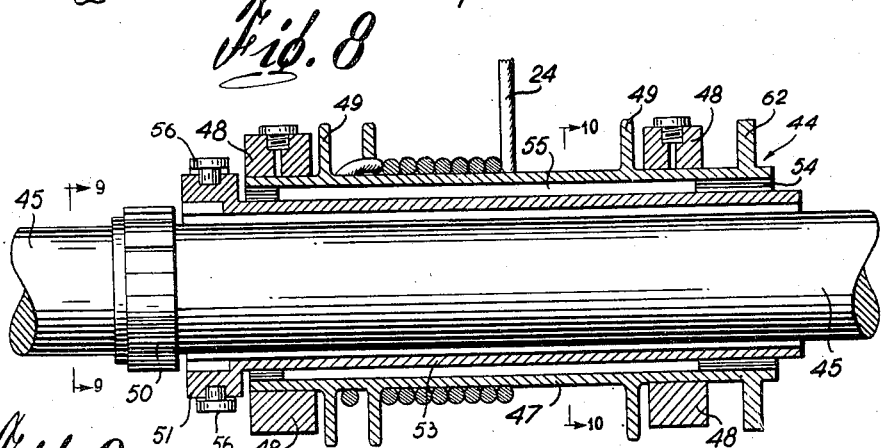
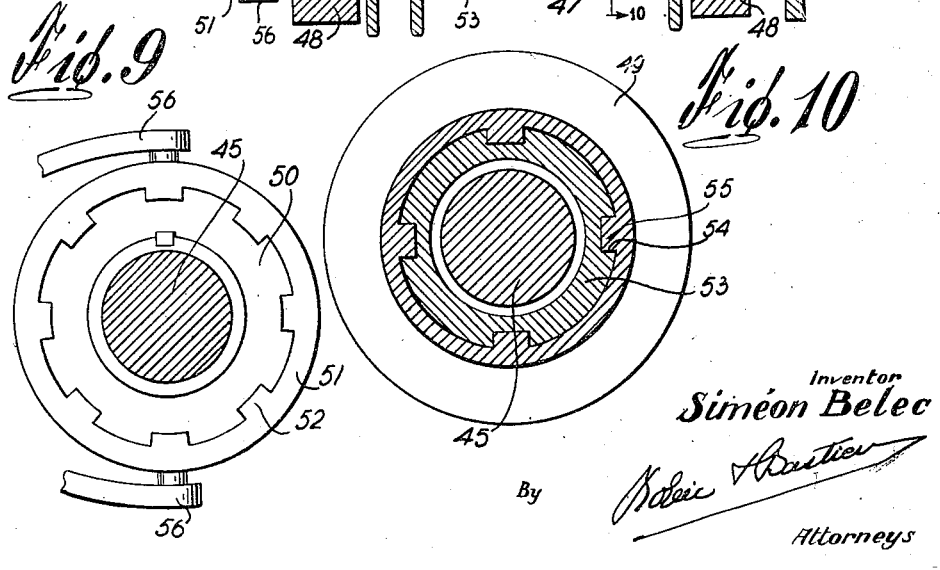

United States Patent Office 2,819,874
Patented Jan. 14, 1958

2,819,874

WHEELED CARRIER MOUNTED DRUM

Simeon Belec, Mont Laurier, Quebec, Canada, assignor of fifty percent to Bernard St. Jean, Mont Laurier, Quebec, Canada Application September 20, 1954, Serial No. 457,241

4 Claims. (Cl. 254—166)

The present invention relates to a novel power take-off for trucks and to a particular application of said power take-off for actuating a novel loading shovel so arranged that it can be readily converted into a crane.

An important object of the present invention is the provision of a power take-off for trucks which is mounted directly on the drive shaft of said truck whereby the conventional transmission of said truck may be used for operating the power take-off.

Another important object of the present invention is the provision of an overhead loading shovel for a truck in which abutment means are provided at the front of the truck for resisting at least part of the stresses imparted to the shovel during the loading operation.

The foregoing and other important objects of the present invention will become more apparent during the following and by referring to the drawings in which:

Figure 1 is a perspective view of the truck and attached loading shovel, in which the latter is in loading position;

Figure 2 is an exploded partial perspective view of the shovel and supporting arms;

Figure 3 is a side perspective of the truck showing the shovel in unloading position;

Figure 4 is a longitudinal cross-section of the shovel showing the manner of attaching the operating cable;

Figure 7 is a plan view of part of the truck chassis showing the power take-off according to the present invention;

Figure 8 is a longitudinal section of the power take-off;

Figure 9 is a cross-section along line 9—9 of Figure 8; and

Figure 10 is a cross-section along line 10—10 of Figure 8.

Figure 5:
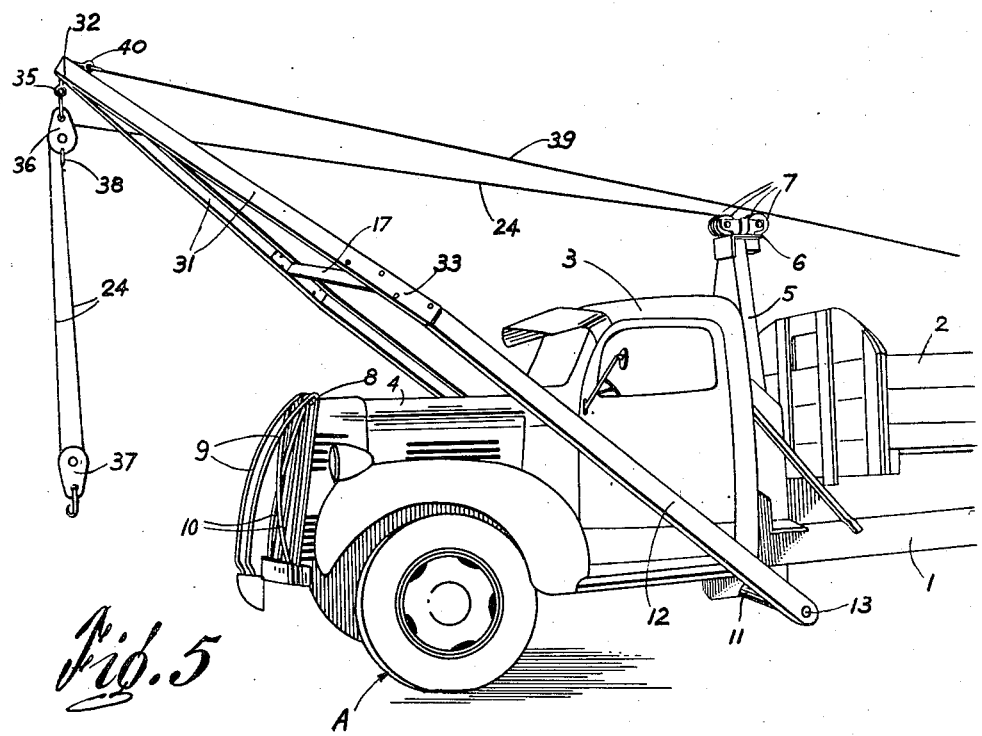
Figure 5 is a partial perspective view of the truck in which the attachment has been converted to form a crane.

Referring now more particularly to the drawings in which like reference characters indicate like elements throughout, the letter A indicates a motor truck having a chassis 1 on which is mounted a dump body 2, a cab 3 in front of the dump body 2, and the engine hood 4 in front of the cab 3.

According to the invention, a first supporting frame 5 is secured to the truck chassis 1 between the dump body 2 and the cab 3 and extends upwardly to project beyond the top of said cab 3, as shown at 6. Two pairs of aligned sheaves 7 are journalled in the upper end 6 of the supporting frame 5 and extend in the longitudinal middle plane of the truck.

A second supporting frame is secured to the truck chassis 1 in front of the engine hood 4 and extends upwardly to the top of said hood 4. Said second supporting frame consists in spaced parallel bars 8 interconnected by diagonal braces 10 and of forwardly extending arcuate rails 9.

A transverse member 11 of the first supporting frame 5 extends underneath the truck chassis 1 behind the cab 3, and provides pivots 13 for a pair of lateral arms 12 which extend on both sides of the truck and may pivot relatively to the same. The outer ends of the arms 12, which are preferably channel-shaped in cross-section, are bent at 14 to provide converging extensions 15 interconnected near their outer bevelled ends 16 by means of a cross brace 17. The extensions 15 and brace 17 are provided with bolt holes 18 and 18' respectively for removably securing a shovel 19 similarly provided with registering bolt holes 20 made in the back 21 of said shovel and bolt holes 22 made in the sides 23 of said shovel.

When the loading shovel 19 is secured to the extensions 15, the back wall 21 of the shovel abuts the cross brace 17 while the bevelled ends 16 of the extensions 15 abut the side walls 23.

In order to pivot the shovel from loading to unloading position, a cable 24 it attached to the first supporting frame 5 at one end and its other end is wound on the drum of a power take-off which will be described hereinafter. The cable 24 is trained on a pulley 41 which is mounted in a recess 26 made in the back wall 21 of the shovel 19. The two strands of the cable 24 are trained on rollers 42 which are mounted on the cross brace 17 and on rollers 27 which are rotatable on a shaft 28 secured to the upper end of the arms 8 of the second supporting frame. These two strands are then trained on the forward pair of sheaves 7 and extend downwardly to be attached to the frame 5 and to be wound on the drum of the power take-off. The drum or winch may be power rotated in the two directions of rotation and suitable brake and clutch means are provided for unwinding the winch under the weight of the shovel at a speed controlled by the brake as will be described hereinafter.

The loading device operates as follows: starting from the loading position shown in Figure 1, the winch is rotated in a direction to pull the cable 24 so that the arms 12 are gradually raised until they have reached a vertical position just above the sheaves 7, and then they continue their movement under the inertia of the assembly and the winch is declutched and the winch brake applied to ease off the descending movement of the shovel.

For returning the shovel to its loading position, the winch is power rotated in reverse direction to pull the cable 24 which is then trained on the rear sheaves 7. This pulling movement is continued until the arms 12 have reached their vertical position, the assembly then travels under its own inertia until the arms 12 are forwardly inclined. The device is then eased down slowly under the action of the winch brake.

For loading the shovel 19, the truck A moves forward thereby causing large stresses to be exerted on said shovel. According to the invention, said stresses are resisted by the front supporting frame because the rails 9 engage angle bars 43 upstanding from the cross brace 17, when the shovel is in loading position. The front supporting frame also prevents transverse displacement of the shovel 19 and arms 12 relative to the truck A.

Figure 6:
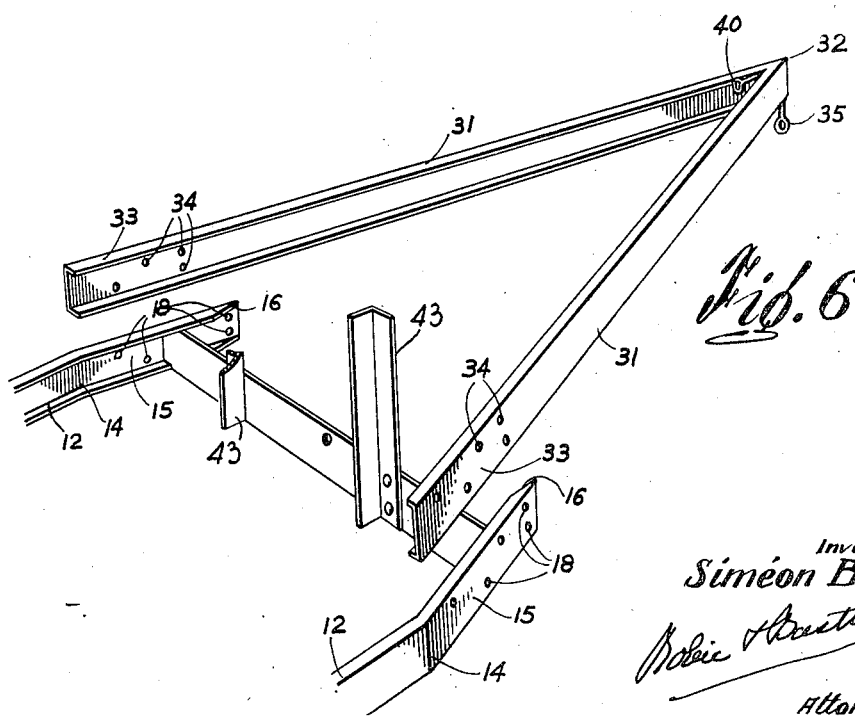
Figure 6 is an exploded perspective view of the supporting arms and V-shaped extension to form the crane.

The attachment, according to the invention, may be easily converted from a truck loading shovel to a power operated crane. This conversion is made by unbolting the shovel 19 from the converging extensions 15 of the arms 12 and replacing said shovel by a V-shaped frame 31 shown more particularly in Figure 6. The frame 31 is made of channel members rigidly secured together at their ends 32 and having their free ends 33 provided with bolt holes 34 adapted to register with the bolt holes 18 of the extensions 15. When bolted against the outer faces of the extensions 15, the V-shaped frame 31 is in alignment with said extensions. The arms 12 and frame 31 form the boom of the crane. Said boom is maintained in forwardly inclined position by a guy wire 39 which is secured to eye 40 of the boom and to the back of the truck A.

A tackle may be suspended from the eye 35 secured to the end 32 of the V-shaped frame 31. Said tackle may comprise a standing block 36 and a running block 37. The cable 24 is attached to the standing block 36 at 38, is trained on the sheaves of the blocks 36 and 37, and is actuated by the winch of the power take-off.

The crane thus formed may be used to lift any load within the capacity of the truck motor.

The power take-off for operating the loading shovel of the crane, previously described, is illustrated in Figures 7 to 10.

This power take-off, which is generally indicated at 44, is directly mounted on the drive shaft 45 of the truck which connects the transmission box of the truck engine (not shown) to the differential 46 of the rear axle, and which is provided with universal joints (not shown) located at suitable points.

The cable 24 is wound on a drum 47 which surrounds and is coaxial with the drive shaft 45, and is rotatably supported at both ends by bearings 48 of cross braces 48' which are secured to the truck chassis 1. Flanges 49 of the drum 47 prevent axial displacement of the latter.

The drum 47 may be engaged with or disengaged from the drive shaft 45 by means of a clutch comprising a gear wheel 50, secured to said drive shaft 45, and a crown 51 having inner teeth 52 adapted to mesh with the gear wheel 50. A sleeve 53, integral with the crown 51, surrounds and is coaxial with the shaft 45 and is axially slidable within the drum 47. The outer face of the sleeve is provided with longitudinal grooves 54 engaged by inwardly and longitudinally extending ribs 55 integral with the drum 47.

An actuating fork lever 56 is pivoted at 57 on a bracket 58 which is secured to a cross-brace 48'. Said fork lever 56 slidably engages a circular groove 59 made in the crown 51, and serves to clutch and unclutch said crown 51 with the gear wheel 50 by displacing said crown axially along the shaft 45, said crown remaining clutched with the drum 47 in all its axial positions due to the interengagement of the drum ribs 55 with the grooves 54 of the sleeve 53.

When declutched, the drum 47 may be braked by the brake device 60 having brake shoes 61 acting on opposite faces of a flange 62 which is secured to the drum 47. The brake device is operated from the cab of the truck through a flexible cable or the like conventional means (not shown).

The power take-off 44 is adapted to be used on a truck equipped with a rear axle clutch so as to allow operation of the power take-off while the truck remains stationary.

Preferably the truck is of the type having a clutch and two-speed transmission system in the differential 46, said system being controlled by a lever 64 pivoted at 65 and having three positions *a, b* and *c* corresponding to low, neutral and high gear, respectively (Fig. 7). This lever is normally actuated by means of an air booster 66, which is controlled from within the cab 3 of the truck A. The air booster 66 is preferably of the diaphragm type in which the diaphragm is displaced by a pressure differential and moves an operating member secured thereto. Such air boosters are commonly used for the air brakes of trucks and similar applications.

According to the present invention, a flexible cable 67 is attached to the outer ends of the lever 64 and fork lever 56 and is manipulated and controlled from within the truck cab 3.

When it is desired to operate the power take-off 44 while the truck A is stationary, the cable 67 is pulled to move the lever 64 from low gear position "*a*" to neutral position "*b*" and to move fork lever 56 to cause engagement of crown 51 with gear 50. In this position, the power take-off 44 may rotate in forward or reverse direction by using the conventional speed transmission system of the truck A.

When it is desired to operate the power take-off 44 while the truck is moving, the air booster 66 is operated to move the lever 64 in high gear position "*c*." This is accomplished while the power take-off remains in engagement with the drive shaft 45.

The power take-off may be disengaged by operating the air booster 66 so as to return the lever 64 into low gear position "*a*"; in this movement, the cable 67 is pulled toward the rear axle to pivot the fork lever 56 into declutching position.

It will be noted that the transmission system of the rear axle may be operated by the air booster 66 in a normal manner, while the power take-off remains idle.

The torque and speed of the power take-off are adjusted by operating the truck engine and its transmission in normal manner.

It has been found in practice that the power take-off, according to the present invention, is very strong and efficient and has a service life as long as that of the truck itself.

Although this power take-off has been described more particularly in conjunction with a loading shovel and a crane attachment, it is obvious that said power take-off may be put to other uses such as, for instance, operating a dump body, in which case it would replace conventional hydraulic systems.

While preferred embodiments according to the present invention have been illustrated and described, it is understood that various modifications may be resorted to without departing from the spirit and scope of the appended claims.

I claim:

1. In an automotive vehicle having a chassis, a drive shaft extending lengthwise of said chassis, a differential and a change speed mechanism operatively connected to said drive shaft; a power take-off comprising a gear wheel coaxial with and secured to said shaft between said differential and said change speed mechanism, sleeve means slidable on and extending lengthwise of said drive shaft, a winch drum surrounding said sleeve means and movable in axial direction of said drive shaft and relative to said sleeve means, means interengaging said drum and said sleeve means for rotation with each other, when said sleeve means is connected for rotation with said gear wheel, means actuatable in axial direction of said sleeve means for coupling the latter with and decoupling the same from said gear wheel, and manipulating means operable from within said vehicle and operatively connected to said change speed mechanism and in operative connection through said actuatable means with said sleeve means to cause connection of the latter with said gear wheel, so that said winch drum may be rotated in accordance with the operation of said change speed mechanism of said vehicle.

2. In a vehicle according to claim 1, said actuatable means including a fork lever slidably engaging a peripheral groove provided in the outer face of said sleeve means, said manipulating means being connected to said fork lever.

3. In a vehicle according to claim 1, including a flange coaxial with and fastened to said winch drum, and brake means actuatable against opposite surfaces of said flange for braking said winch drum.

4. In a vehicle according to claim 1, including bearing means for said winch drum and extending in crosswise direction to the latter for connection with said chassis.

References Cited in the file of this patent

UNITED STATES PATENTS

| | | |
|---|---|---|
| 1,301,643 | Blank | Apr. 22, 1919 |
| 1,565,829 | Thibaudeau | Dec. 15, 1925 |
| 1,791,979 | Sharp | Feb. 10, 1931 |
| 1,858,314 | Summerlot | May 17, 1932 |
| 2,016,130 | Wren | Oct. 1, 1935 |
| 2,282,731 | Larsen et al. | May 12, 1942 |
| 2,327,473 | Wagner et al. | Aug. 24, 1943 |